BEST AVAILABLE COPY

DEFENSIVE PUBLICATION T857,010

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 43

663,484

PHENYLAZO CATIONIC DYES HAVING AN AZAINDOLE-2-ONE COUPLING COMPONENT

James M. Straley and John G. Fisher, both % Tennessee Eastman Company, P.O. Box 511, Kingsport, Tenn. 37662

Filed Aug. 28, 1967. Published Dec. 3, 1968
Class 260—152
No Drawing. 11 Pages Specification

Monoazo cations useful in the dyeing of acrylic, modacrylic and acid modified polyester textile materials contain an aniline diazo component and a coupling component having the formula

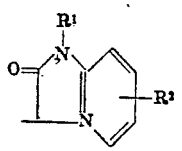

wherein $R^1$ and $R^2$ each are hydrogen or lower alkyl.